US009975499B2

(12) United States Patent
Popham et al.

(10) Patent No.: US 9,975,499 B2
(45) Date of Patent: May 22, 2018

(54) WADING APPARATUS FOR A VEHICLE AND METHOD OF USE

(71) Applicant: Jaguar Land Rover Limited

(72) Inventors: Thomas Popham, Coventry (GB); Alain Dunoyer, Coventry (GB)

(73) Assignee: Jaguar Land Rover Limited, Whitley, Coventry, Warwickshire (GB)

(*) Notice: Subject to any disclaimer, the term of this patent is extended or adjusted under 35 U.S.C. 154(b) by 369 days.

(21) Appl. No.: 14/354,593

(22) PCT Filed: Oct. 26, 2012

(86) PCT No.: PCT/EP2012/071237
§ 371 (c)(1),
(2) Date: Apr. 27, 2014

(87) PCT Pub. No.: WO2013/060830
PCT Pub. Date: May 2, 2013

(65) Prior Publication Data
US 2014/0293056 A1  Oct. 2, 2014

(30) Foreign Application Priority Data
Oct. 27, 2011  (GB) .................. 1118623.6

(51) Int. Cl.
B60R 11/04 (2006.01)
G01F 23/00 (2006.01)
(Continued)

(52) U.S. Cl.
CPC .............. B60R 11/04 (2013.01); B60R 1/00 (2013.01); G01F 23/0061 (2013.01);
(Continued)

(58) Field of Classification Search
CPC combination set(s) only.
See application file for complete search history.

(56) References Cited

U.S. PATENT DOCUMENTS 6,098,029 A    8/2000  Takagi et al.
6,542,076 B1 * 4/2003  Joao ............... B60R 25/018
                                            307/10.2
(Continued)

FOREIGN PATENT DOCUMENTS

EP  2145289    1/2010
GB  2356602 A  5/2001
(Continued)

OTHER PUBLICATIONS

International Search Report for application No. PCT/US2012/071237 dated May 3, 2013, 5 pages.
(Continued)

Primary Examiner — Dave Czekaj
Assistant Examiner — Tyler W Sullivan
(74) Attorney, Agent, or Firm — Reising Ethington P.C.

(57) ABSTRACT

A motor vehicle includes imaging apparatus comprising at least one camera. The apparatus is operable to provide a wade image to an occupant of the vehicle being an image of at least a portion of an exterior surface of the vehicle that is exposed to liquid when wading. The wade image is arranged to allow the occupant to determine whether the level of the liquid is below a prescribed level. Embodiments of the invention are advantageous over known wade aid devices such as ultrasonic sensor arrangements in that a driver is able to view directly a level of liquid such as water in which the vehicle is wading. Furthermore embodiments of the invention have a reduced settling time when switched on compared with ultrasonic sensor arrangements.

21 Claims, 3 Drawing Sheets

(51) Int. Cl.
  *G01F 23/292* (2006.01)
  *G01F 23/296* (2006.01)
  B60R 1/00 (2006.01)
  *B60R 11/00* (2006.01)

(52) U.S. Cl.
  CPC ........ *G01F 23/0076* (2013.01); *G01F 23/292* (2013.01); *G01F 23/2962* (2013.01); *B60R 2011/004* (2013.01); *B60Y 2200/42* (2013.01); *B60Y 2400/3015* (2013.01)

(56) References Cited

U.S. PATENT DOCUMENTS

| | | | | |
|---|---|---|---|---|
| 2005/0170710 A1* | 8/2005 | Darby | ............... | B60F 3/00 440/12.51 |
| 2009/0061702 A1* | 3/2009 | March | ............... | B60F 3/0007 440/12.52 |
| 2009/0261957 A1* | 10/2009 | Kido | ............... | B60K 35/00 340/435 |
| 2009/0295558 A1* | 12/2009 | Kameyama | ............... | G08G 1/166 340/438 |
| 2009/0309970 A1* | 12/2009 | Ishii | ............... | B60R 1/00 348/143 |
| 2010/0165100 A1* | 7/2010 | Asai | ............... | B60R 1/00 348/135 |
| 2010/0245579 A1* | 9/2010 | Hongo | ............... | B60R 1/00 348/148 |
| 2010/0253540 A1* | 10/2010 | Seder | ............... | B60R 1/00 340/905 |
| 2011/0001428 A1* | 1/2011 | Rodriguez Barros | ............... | B60Q 1/2665 315/77 |
| 2012/0069591 A1* | 3/2012 | Pastrick | ............... | B60Q 1/2665 362/494 |
| 2013/0103274 A1* | 4/2013 | Binder | ............... | B60W 40/06 701/65 |
| 2013/0151088 A1* | 6/2013 | Ricci | ............... | G06F 17/00 701/51 |
| 2013/0155236 A1* | 6/2013 | Ramdeo | ............... | H04N 7/183 348/148 |
| 2014/0192181 A1* | 7/2014 | Taylor | ............... | B60C 23/0408 348/118 |

FOREIGN PATENT DOCUMENTS

| | | |
|---|---|---|
| WO | WO03051672 A1 | 6/2003 |
| WO | WO2009013606 A2 | 1/2009 |

OTHER PUBLICATIONS

UK Combined Search and Examination Report for corresponding application No. GB 12192661, dated Feb. 8, 2013, 6 pages.

* cited by examiner

WADING APPARATUS FOR A VEHICLE AND METHOD OF USE

FIELD OF THE INVENTION

The present invention relates to a wading apparatus and method. In particular but not exclusively the invention relates to a motor vehicle suitable for wading and to a method of operating a vehicle suitable for wading. Aspects of the invention relate to an apparatus, to a method and to a vehicle.

BACKGROUND

It is known to provide a motor vehicle suitable for performing wading operations in water. For example, 'off-road' vehicles are known that are suitable for performing wading operations at depths of over 0.3 m and in some cases at least 1.0 m The problem exists that a driver driving over uneven, submerged ground may experience difficulty in determining whether the level of water around the vehicle is below a prescribed water level limit of the vehicle.

Most on-road vehicles are capable of driving through shallow water, for example water of depth 150 mm or less as long as the vehicle speed is slow enough not to cause excessive splashing. Driving through water of a depth up to around 300 mm is often referred to as 'fording'.

For road vehicles, the ride height (i.e. the height of the vehicle floor above ground) is typically lower than for off-road vehicles. Due to this relatively lower ride height a fording event for a road vehicle may pose similar risks of water affecting vehicle systems as a wading event for an off-road vehicle. As such, the use of the term wading in respect of the present invention may be considered to include any fording or wading event.

It is known to provide a wading apparatus to assist a driver in conducting a wading operation. The apparatus comprises multiple ultrasonic sensors that are mounted around the vehicle for determining a distance of the surface of water from the sensors during a wading operation. The signals from the sensors allow vehicle pitch and roll to be determined.

Use of ultrasonic sensors has the disadvantage that a settling time must be allowed after switching on the sensors before reliable distance information can be obtained by means of the sensors.

SUMMARY OF THE INVENTION

Aspects of the invention provide a vehicle, a method and an apparatus as claimed in the appended claims.

In one aspect of the invention there is provided an apparatus for a motor vehicle having at least one camera the apparatus being operable to provide a wade image to an occupant of the vehicle of at least a portion of an exterior surface of the vehicle that is exposed to liquid when wading, the wade image being arranged to allow the occupant to determine whether the level of the liquid is below a prescribed level.

In one aspect of the invention there is provided a motor vehicle having an imaging apparatus comprising at least one camera, the apparatus being operable to provide a wade image to an occupant of the vehicle being an image of at least a portion of an exterior surface of the vehicle that is exposed to liquid when wading, the wade image being arranged to allow the occupant to determine whether the level of the liquid is below a prescribed level.

This has the advantage that in some embodiments imaging apparatus that is already provided in a vehicle may be employed to provide an image of a portion of the exterior surface whilst wading.

Advantageously the imaging apparatus may be operable to adjust a position of the camera thereby to provide the wade image of the at least a portion of the exterior of the vehicle to the occupant.

Thus the imaging apparatus may be arranged to tilt and/or translate the camera when it is required to provide the wade image.

Thus if the camera is also used as a parking aid the camera may be re-oriented so that it is able to be used to provide the wade image.

Advantageously the imaging apparatus may be operable automatically to reposition the camera to provide the wade image.

Optionally the imaging apparatus is arranged to provide a wade image of a side of the vehicle.

The imaging apparatus may be arranged to provide a wade image of a plurality of sides of the vehicle.

The imaging apparatus may comprise a plurality of cameras.

Advantageously the imaging apparatus may be arranged to provide a wade image of each of two opposite sides of the vehicle.

This feature has the advantage that the occupant may determine the liquid level on each of the opposite sides of the vehicle. Thus if the terrain over which the vehicle is conducting the wading operation is uneven the driver may determine whether either side of the vehicle is at or approaching a maximum allowable depth of immersion in the liquid and take action to prevent the depth from being exceeded.

Advantageously the imaging apparatus may be arranged automatically to provide the wade image when it is determined that the vehicle is wading.

Further advantageously the vehicle may be arranged to determine that the vehicle is wading responsive to at least one selected from amongst a driver-selectable input, reference to the wade image, one or more moisture sensors and reference to an output of distance sensing means.

Thus the vehicle may have a driver-selectable input such as a switch operable to cause the vehicle to provide the wade image. Alternatively or in addition the imaging apparatus may be arranged to monitor the output of the camera thereby to determine by means of image recognition means whether the vehicle is wading. In some embodiments one or more moisture sensors are arranged to sense moisture corresponding to a wading operation and to cause the vehicle to determine that the vehicle is wading. In a still further alternative the vehicle may be configured to determine that it is wading responsive to an input from one or more distance measuring or distance sensing means arranged to sense a proximity of a surface such as a surface of water or other liquid in which the vehicle is wading from the distance sensing means. The distance sensing means may comprise one or more ultrasonic sensors and/or one or more optical sensors.

The imaging apparatus may comprise distance sensing means, the vehicle being operable to determine that the vehicle is wading responsive to an output of the distance sensing means.

The vehicle may comprise the distance sensing means, the vehicle being operable to determine that the vehicle is wading responsive to an output of the distance sensing means in combination with the wade image.

For example, the vehicle may be operable to process the wade image to determine whether the vehicle is wading through liquid. If the portion of the image that is expected to correspond to water when wading is not of a colour corresponding to water the vehicle may be configured to determine that the vehicle is not wading through liquid and therefore not provide the wade image to the occupant of the vehicle even if the distance sensing means indicates the vehicle may be travelling through liquid.

It is to be understood that the vehicle may be arranged to conduct one or more other determinations in respect of the image in addition to or instead of the determination in respect of colour. For example the vehicle may be arranged to analyse a texture or other feature of the image in order to determine whether the texture corresponds to a liquid.

It is to be understood that ultrasonic sensors have the disadvantage that a 'settling period' must be allowed to expire following activation of a sensor, the settling period being a period during which a reliable measurement of distance of the water from the sensor cannot be made.

The vehicle may be arranged to provide an output corresponding to a distance measured by the distance measuring means.

The output may provide an indication of the depth of the liquid in which the vehicle is wading, and/or a difference between the depth of liquid in which the vehicle is wading and a maximum allowable depth. Other arrangements are also useful.

The output may comprise a visual output.

Alternatively or in addition the output may comprise an audible output.

For example the output may be an audible output in the form of pulses of a tone, a repetition rate of the pulses increasing as a depth of liquid in which the vehicle is wading increases in a similar manner to parking sensors.

Advantageously the distance sensing means may comprise at least one selected from amongst one or more ultrasonic sensors and one or more optical sensors.

The vehicle may be operable automatically to provide the wade image to the user when the vehicle is wading.

The at least one camera may be arranged obliquely to view at least a portion of the exterior surface of the vehicle, the imaging apparatus being arranged to rectify at least a portion of the image provided by the at least one camera thereby to reduce an amount of distortion therein relative to a view of the portion of the vehicle from a substantially normal incidence.

Thus if the at least one camera is mounted at a location from which the portion of the exterior surface is viewed with non-normal incidence, the image may be rectified to reduce distortion due to the non-normal incidence compared with a view at normal or substantially normal incidence, or any other suitable angle of view.

The wade image may be arranged to include at least a portion of an exterior surface of the vehicle that includes a feature by means of which the occupant may determine whether the level of liquid is below the prescribed level.

The feature may comprise an external component of the vehicle.

The external component may comprise a fluid inlet of the vehicle such as an air intake of the vehicle, for example an engine air inlet or intake grille, a cabin air inlet grille or any other suitable inlet. Alternatively or in addition the external component may comprise a portion of a wheel arch.

Alternatively the feature may be a specific liquid level indicator marking provided on the exterior surface of the vehicle.

The vehicle may be operable to superimpose a liquid level indicator marking on the wade image.

This feature has the advantage that it is not necessary to provide a marking on the exterior surface of the vehicle, since a marking is superimposed on the image viewed by the occupant.

Furthermore this feature allows the occupant to obtain an understanding of a wading depth of the vehicle independently of the presence of a feature on the exterior surface of the vehicle such as an air inlet. It is to be understood that a more precise indication of a depth of liquid in which the vehicle is wading may therefore be obtained.

Advantageously the prescribed liquid level may correspond to a maximum authorised liquid level for the vehicle whilst wading.

The maximum authorised liquid level may be a liquid level above which damage may occur to one or more portions of the vehicle, for example by ingestion of liquid into the engine.

The vehicle may be further configured automatically to activate illumination means for illuminating the portion of the vehicle viewed in the wade image when it is determined that the vehicle is wading.

The illumination means may comprise one or more lights. The illumination means may be arrange to emit one or more of infra red radiation, visible light and ultraviolet light. In some arrangements the illumination means may be arranged to emit substantially only one selected from amongst infra-red radiation, ultraviolet radiation and visible radiation.

The camera may be an infra-red camera or a visible light camera. Other arrangements are also useful.

Optionally the imaging apparatus may be operable automatically to monitor the wade image and to compare one or more features of the wade image with reference data thereby to determine when one or more portions of the vehicle are obscured by water.

The apparatus may be arranged to provided data to a vehicle occupant responsive to one or more wade images and/or other inputs such as one or more sensor inputs, the data being data in respect of one or more selected from amongst vehicle pitch angle, vehicle roll angle and estimated water depth.

Thus the apparatus may provide vehicle attitude information in some arrangements.

The vehicle may be operable automatically to determine when a vehicle is in danger of exceeding a prescribed wade depth and to provide to an occupant at least one selected from amongst an audible alarm, spoken or written driver advice and an animated representation of the vehicle responsive to the determination.

The at least one camera may be movable from an initial state to a deployed state, wherein the distance between the at least one camera and an adjacent exterior surface of the vehicle increases when the camera is moved toward the deployed state. The at least one camera may be mounted on a wing mirror unit of the vehicle.

In a further aspect of the invention there is provided a method of operating a vehicle comprising the step of providing to an occupant of the vehicle a wade image being an image of at least a portion of an exterior surface of the vehicle that is exposed to liquid when wading, the wade image being arranged to allow the occupant to determine whether the level of the liquid is below a prescribed level.

In a still further aspect of the invention there is provided a method of wading comprising operating a vehicle to wade through water with reference to a wade image being an image of at least a portion of an exterior surface of the vehicle that is exposed to liquid when wading, the method further comprising determining whether the level of the liquid is below a prescribed level by reference to the wade image.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, embodiments described in connection with one embodiment are applicable to all embodiments unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
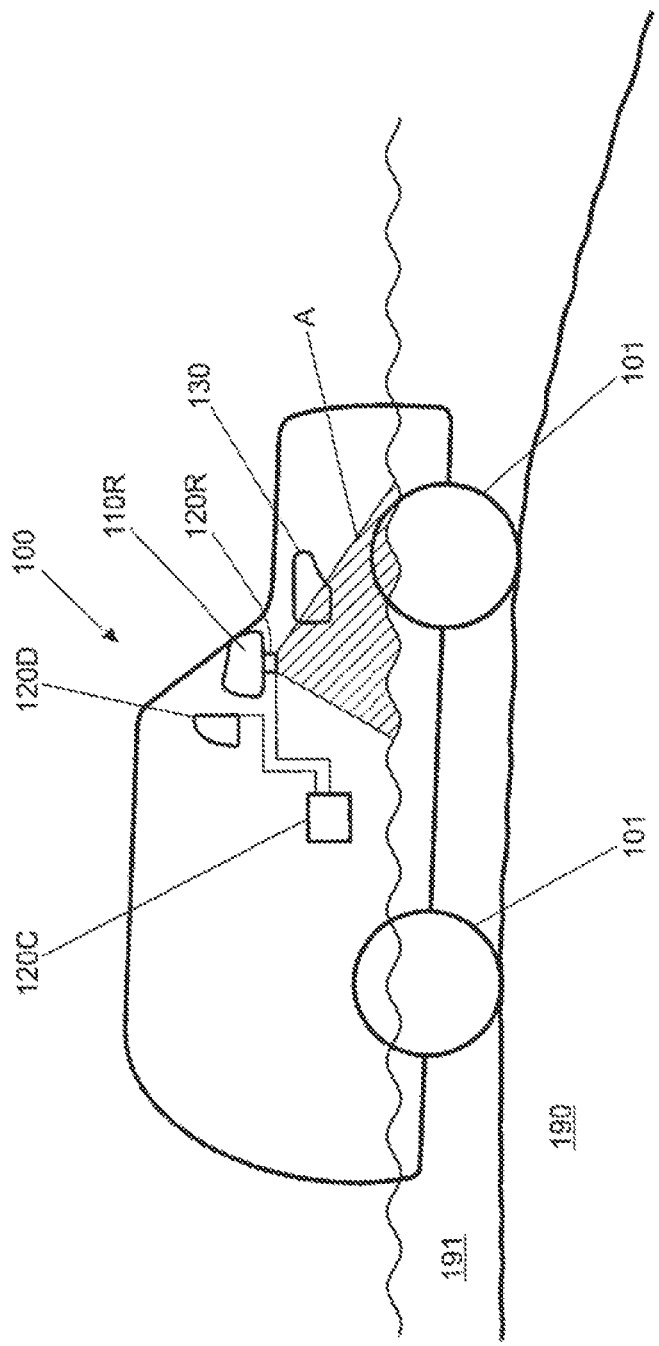
FIG. 1 is a schematic illustration of a vehicle according to an embodiment of the present invention during a wading operation in side view.
Figure 2:
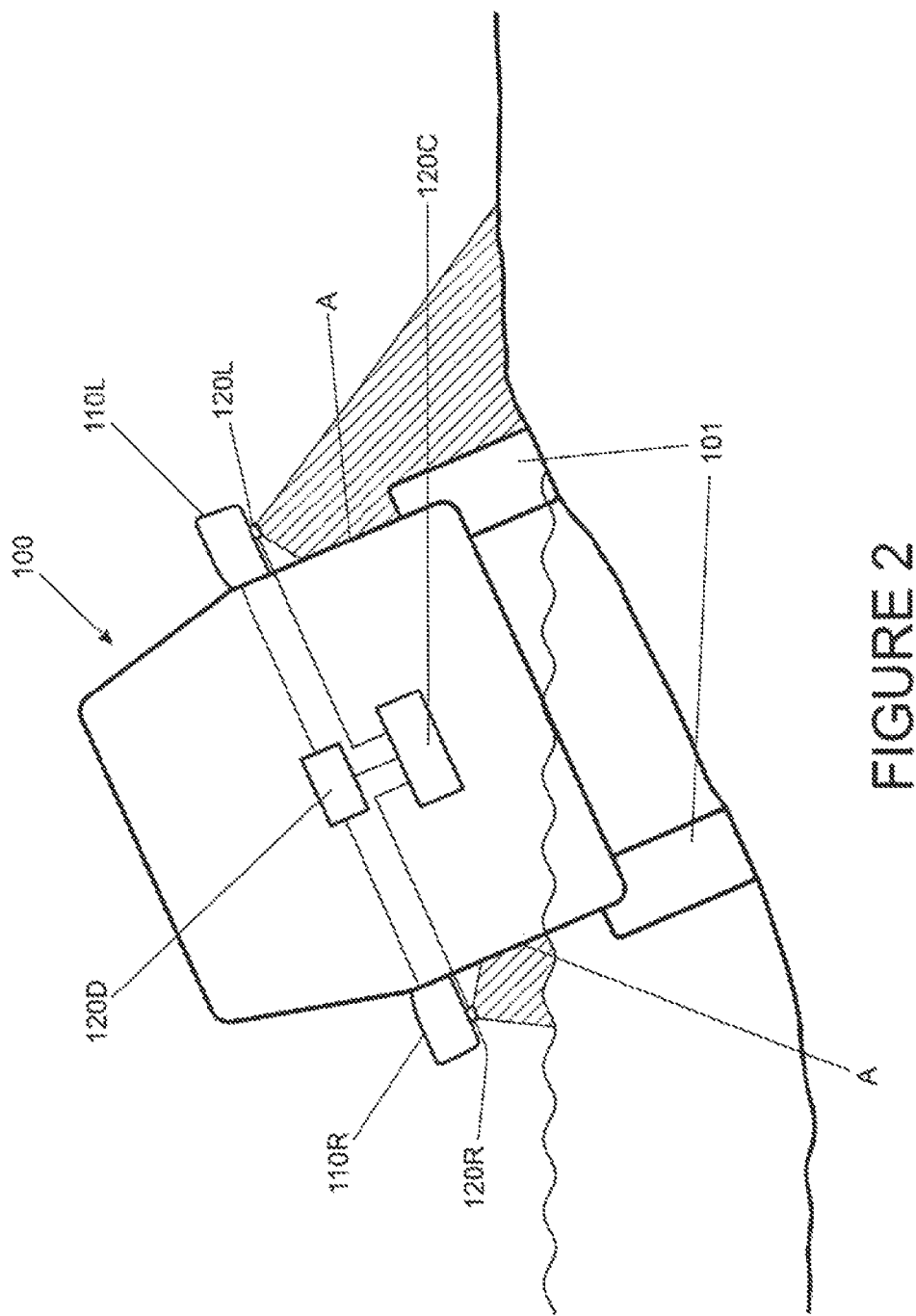
FIG. 2 is a schematic illustration of the vehicle of FIG. 1 during a wading operation as viewed from a front of the vehicle.

FIGS. 1 and 2 show a vehicle according to an embodiment of the present invention during a wading operation. The vehicle is shown wading through a layer of water 191 on a surface 190.

The vehicle 100 has wing mirror units 110R, 110L on right and left sides of the vehicle respectively. Each mirror unit 110R, 110L has a respective camera 120R, 120L mounted therein that is positioned so as to provide a view of an area A of left and right sides of the vehicle 100 respectively. The controller 120C is arranged to process images generated by the cameras 120R, 120L and to display the images on a display unit 120D.

The area A is arranged to include portions of each side of the vehicle 100 that are above and below a maximum prescribed level of liquid in which the vehicle 100 may conduct a wading operation. This allows the driver to determine whether the liquid level is above or below the prescribed level.

In the embodiment shown in FIG. 1 the area A includes a portion of an air intake grille 130 through which air may be drawn into an engine of the vehicle 100. In this embodiment the vehicle 100 is arranged such that it may conduct wading operations at water levels that are below the lower level of the intake grille 130. If the water level exceeds the level of the grille 130 and passes through the grille 130, a risk exists that the water will be drawn into the engine, potentially causing damage to the engine.

Thus as the vehicle 100 is being driven in water or other liquid, the driver may monitor a wade image of the left and right sides of the vehicle 100 and control the vehicle 100 such that the level of water does not exceed the lower level of the grille 130.

It is to be understood that the cameras 120R, 120L are arranged obliquely to view their respective sides of the vehicle 100. Thus the images obtained by the cameras 120R, 120L are distorted relative to a view that would be obtained if the respective sides were viewed along a direction normal to the sides.

Accordingly the controller 120C is configured to process the images generated by the cameras 120R, 120L in order to reduce an amount of distortion of each image relative to an image that would be obtained if the cameras 120R, 120L were arranged to view the side at normal incidence.

Figure 3:
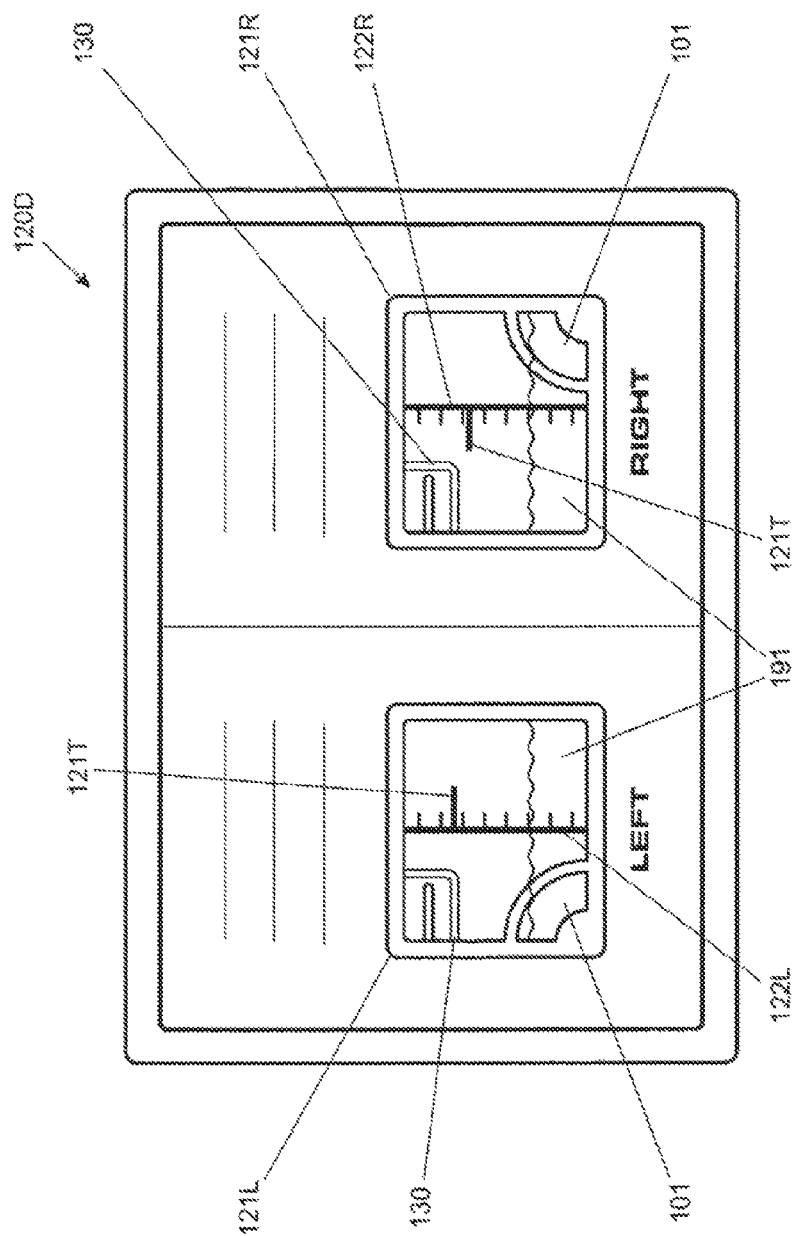
FIG. 3 is a schematic illustration of a display unit of the vehicle of FIG. 1.

FIG. 3 is a schematic illustration of the display unit 120D showing left and right images 121L, 121R showing left and right sides of the vehicle 100 respectively. In the images shown the driver is able to see portions of respective left and right air intake grilles 130 and front wheels 101. It can be seen that a level to which the respective side of the vehicle 100 is immersed in water 191 may be determined by the driver with reference to the images 121L, 121R.

It is to be understood that the images 121L, 121R allow the driver more quickly and reliably to determine whether the level of water around the vehicle 100 is below the allowable level.

Superimposed on each image 121L, 121R is a vertical scalebar 122L, 122R having tick markings at intervals therealong. In the embodiment shown the driver may determine the level of water 191 in which the vehicle is wading by reference to the scalebars 122L, 122R. The scalebars 122L, 122R are arranged such that corresponding tick markings of the left and right scalebars 122L, 122R indicate the same depth of water as one another for their respective sides. This allows the driver quickly and reliably to determine whether one side of the vehicle 100 is immersed in water 191 to a greater depth than the other whilst conducting a wading operation. One of the tick markings 122T is longer than the others and corresponds to a maximum authorised wading depth of the vehicle 100.

It is to be understood that vehicles according to some embodiments of the invention are equipped with one or more further cameras operable to provide an image of a portion of a surface of the vehicle 100 from which the driver may also obtain an assessment of a depth of liquid in which the vehicle 100 is wading.

In some arrangements one or more distance measuring sensors may be fitted to the vehicle 100. The controller 120C may be configured to monitor an output of the one or more sensors in order to determine a distance of the surface of the water 191 from the sensor. This information can provide a useful indication of a wading depth and an output of the sensor may be provided on the display 120D. For example an output indicating a depth to which the vehicle 100 is wading in the water 191.

It is to be understood that provision of the images 121L, 121R can be useful in determining whether the vehicle 100 is in fact wading in water 191 or whether the vehicle is driving through tall grass, for example by reference to a colour of the image. For example, if a sensor determines the vehicle may be wading but the corresponding image images 121L, 121R indicates the vehicle is wading over a green surface the vehicle may determine the vehicle is driving over grass and not through water. Other arrangements are also useful.

As mentioned previously, the cameras 120R, 120L are mounted on the respective wing mirror units 110R, 110L, and are arranged obliquely to view respective sides of the vehicle 100, the resulting images being processed by the controller 120C in order to compensate for the oblique viewing angle. In this way, the images can be presented to the vehicle occupant as a view of the side of the vehicle 100 at normal incidence. However, notwithstanding the compensation performed by the controller 120C, the accuracy of the wade images provided to the vehicle occupant can be improved if the cameras 120R, 120L are spaced further away from the respective sides of the vehicle 100 such that the viewing angle of each unprocessed image is less oblique, and hence requires a lesser degree of compensation.

To this end, in one embodiment, each wing mirror unit 110R, 110L is mounted such that it is movable along an axis substantially perpendicular to the respective adjacent side of the vehicle 100, from an initial state to a deployed state. In the initial state, each wing mirror unit 110R, 110L is positioned for normal on-road use or off-road use when not wading. In the deployed state, the wing mirror units 110R, 110L are moved so as to be spaced further away from the sides of the vehicle 100. Thus, in the deployed state, each camera 120R, 120L views the respective side of the vehicle at a less oblique angle than in the initial state. In both the initial and the deployed state, the mirror glass of each wing mirror unit 110R, 110L is positioned at an angle which enables the driver to see behind the vehicle 100.

With the above configuration, the wing mirror units 110R, 110L may be moved into their respective deployed states during wading so as to improve the accuracy of the wade images provided to the vehicle occupants. The wing mirror units 110R, 110L may be deployed in dependence on the same conditions under which the wade image is displayed. For example, the wing mirror units 110R, 110L may be deployed upon operation of a driver-selectable switch. Alternatively, the cameras 120R, 120L may be operable to determine, by means of image recognition means, that the vehicle 100 is wading and the wing mirror units 110R, 110L may be deployed in dependence on such a determination being made. Alternatively, or in addition, the wing mirror units 110R, 110L may be deployed in dependence on a signal output from one or more moisture sensors operable to determine when the vehicle 100 is wading. Alternatively, or in addition, the vehicle 100 may be provided with distance sensing means operable to sense a proximity of a surface, such as water, the wing mirror units 110R, 110L being deployed when it is determined that the vehicle 100 is wading in dependence on the output of the distance sensing means.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A motor vehicle having an imaging apparatus comprising at least one camera, a controller and a display unit, wherein the at least one camera is mounted on a wing mirror unit of the vehicle and is configured to generate a parking aid image and a wade image, the camera being positionable to view at least a portion of an exterior lateral side surface of the vehicle that is exposed to liquid when wading to generate the wade image, the controller being arranged to process the wade image generated by the camera and display the wade image on the display unit to an occupant of the vehicle, the displayed wade image being arranged to allow the occupant to determine whether the level of the liquid is below a vehicle water wading level, wherein the imaging apparatus is configured to adjust a position of the camera between an initial state to generate the parking aid image and a deployed state to generate the wade image of the at least a portion of the exterior lateral side surface of the vehicle to the occupant.

2. A vehicle as claimed in claim 1 wherein the imaging apparatus is configured automatically to reposition the camera to provide the wade image.

3. A vehicle as claimed in claim 1 wherein the vehicle is arranged to determine that the vehicle is wading responsive to at least one selected from amongst a driver-selectable input, reference to the wade image, one or more moisture sensors, and reference to an output of a distance sensing sensor operable to sense the proximity of a water surface, and wherein the imaging apparatus is arranged automatically to provide the wade image when it is determined that the vehicle is wading.

4. A vehicle as claimed in claim 3 comprising the distance sensing sensor, the vehicle being configured to determine that the vehicle is wading responsive to an output of the distance sensing sensor.

5. A vehicle as claimed in claim 4 arranged to provide an output corresponding to a distance measured by the distance sensing sensor.

6. A vehicle as claimed in claim 5 wherein the output comprises at least one of a visual output and an audible output.

7. A vehicle as claimed in claim 4 wherein the distance sensing sensor comprises at least one selected from amongst one or more ultrasonic sensors and one or more optical sensors.

8. A vehicle as claimed in claim 4 configured automatically to provide the wade image to the user when the vehicle is wading.

9. A vehicle as claimed in claim 3 comprising the distance sensing sensor, the vehicle being configured to determine that the vehicle is wading responsive to an output of the distance sensing sensor in combination with the wade image.

10. A vehicle as claimed in claim 1 wherein the at least one camera is arranged obliquely to view at least a portion of the exterior surface of the vehicle, the imaging apparatus being arranged to rectify at least a portion of the image provided by the at least one camera thereby to reduce distortion therein due to the oblique arrangement of the camera, relative to a view of the portion of the vehicle from a normal incidence relative to the portion of the exterior surface of the vehicle.

11. A vehicle as claimed in claim 1 wherein the wade image is arranged to include at least a portion of an exterior surface of the vehicle that includes a feature indicating the vehicle water wading level.

12. A vehicle as claimed in claim 11 wherein the feature comprises an external component of the vehicle.

13. A vehicle as claimed in claim 1 configured to superimpose a liquid level indicator marking on the wade image.

14. A vehicle as claimed in claim 1 wherein the vehicle water wading level corresponds to a maximum liquid level in which the vehicle may conduct a wading operation.

15. A vehicle as claimed in claim 1 further configured automatically to activate a light for illuminating the portion of the vehicle viewed in the wade image when it is determined that the vehicle is wading.

16. A vehicle as claimed in claim 1 wherein the imaging apparatus is configured automatically to monitor the wade image and to compare one or more features of the wade image with a reference image thereby to determine when one or more portions of the vehicle are obscured by water.

17. A vehicle as claimed in claim 1 wherein the imaging apparatus is configured to provide data to a vehicle occupant responsive to one or more wade images, the data being data in respect of one or more selected from amongst vehicle pitch angle, vehicle roll angle and estimated water depth.

18. A vehicle as claimed in claim 1 configured automatically to determine when a vehicle is in water approaching the vehicle water wading level and to provide to an occupant at least one selected from amongst an audible alarm, spoken or written driver advice and an animated representation of the vehicle responsive to the determination.

19. A vehicle as claimed in claim 1, wherein said at least one camera is movable from an initial state to a deployed state, wherein the distance between the at least one camera and an adjacent exterior surface of the vehicle increases when the camera is moved toward the deployed state.

20. A method of operating a vehicle comprising the step of positioning a camera on a wing mirror unit of the vehicle, adjusting the position of the camera from an initial state in which the camera generates a parking aid image to a deployed state in which the camera views at least a portion of a lateral side exterior surface of the vehicle that is exposed to liquid when wading and generates a wade image, receiving the wade image generated by the camera and displaying the wade image on a display unit to an occupant of the vehicle, the wade image being arranged to allow the occupant to determine whether the level of the liquid is below a vehicle water wading level.

21. An apparatus for a motor vehicle comprising at least one camera mounted on a wing mirror unit of the vehicle, a controller and a display unit, the camera being positionable between an initial state in which the camera generates a parking aid image and a deployed state in which the camera views at least a portion of a lateral side exterior surface of the vehicle that is exposed to liquid when wading and generates a wade image, the controller being arranged to process the wade image generated by the camera and display the wade image on the display unit to an occupant of the vehicle, the displayed wade image being arranged to allow the occupant to determine whether the level of the liquid is below a vehicle water wading level.

* * * * *